(12) United States Patent
Ishikawa et al.

(10) Patent No.: US 12,091,359 B2
(45) Date of Patent: Sep. 17, 2024

(54) SEALING HEAD FOR MANUFACTURING GLASS PANEL UNIT AND METHOD FOR SEALING WORK IN PROGRESS OF GLASS PANEL UNIT

(71) Applicant: Panasonic Intellectual Property Management Co., Ltd., Osaka (JP)

(72) Inventors: Haruhiko Ishikawa, Osaka (JP); Takeshi Shimizu, Osaka (JP); Masataka Nonaka, Osaka (JP); Eiichi Uriu, Osaka (JP); Kazuya Hasegawa, Osaka (JP); Tasuku Ishibashi, Ishikawa (JP); Hiroyuki Abe, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 1023 days.

(21) Appl. No.: 17/044,233

(22) PCT Filed: Feb. 28, 2019

(86) PCT No.: PCT/JP2019/007921
§ 371 (c)(1),
(2) Date: Sep. 30, 2020

(87) PCT Pub. No.: WO2019/187964
PCT Pub. Date: Oct. 3, 2019

(65) Prior Publication Data
US 2021/0017074 A1    Jan. 21, 2021

(30) Foreign Application Priority Data
Mar. 30, 2018   (JP) .................................. 2018-069720

(51) Int. Cl.
| | | |
|---|---|---|
| C03C 27/06 | (2006.01) | |
| E06B 3/66 | (2006.01) | |
| E06B 3/677 | (2006.01) | |

(52) U.S. Cl.
CPC ............ *C03C 27/06* (2013.01); *E06B 3/6612* (2013.01); *E06B 3/6775* (2013.01)

(58) Field of Classification Search
None
See application file for complete search history.

(56) References Cited

U.S. PATENT DOCUMENTS

| | | |
|---|---|---|
| 5,797,780 A | 8/1998 | Peng |
| 2019/0077703 A1 | 3/2019 | Shimizu et al. |

(Continued)

FOREIGN PATENT DOCUMENTS

| | | |
|---|---|---|
| JP | 2001-354456 A | 12/2001 |
| JP | 2017-141136 A | 8/2017 |

(Continued)

OTHER PUBLICATIONS

JP 2000195426 machine translation, Koyama Shinya, Sealing method and closed housing and image display device and evacuation device, Jul. 2000 (Year: 2000).*

(Continued)

*Primary Examiner* — Queenie S Dehghan
(74) *Attorney, Agent, or Firm* — Rimon P.C.

(57) ABSTRACT

A sealing head includes a frame, an intake unit, a pressing pin, and a non-contact heater. The frame is configured to be detachably attached to a work in progress of a glass panel unit. The intake unit, the pressing pin, and the non-contact heater are supported by the frame. The work in progress includes a first substrate, a second substrate, a bonding part, and an internal space. The first substrate has an evacuation port. The bonding part bonds the first substrate and the (Continued)

second substrate together. The internal space is formed by being surrounded by the first substrate, the second substrate, and the bonding part. The internal space is communicated with the evacuation port. The pressing pin is configured to press, toward the second substrate, a sealing material which is heat fusible and which is inserted into the evacuation port. The non-contact heater is configured to locally heat the sealing material in a non-contact manner via the second substrate.

17 Claims, 9 Drawing Sheets

(56) References Cited

U.S. PATENT DOCUMENTS

2019/0084878 A1 3/2019 Nonaka et al.
2019/0119142 A1 4/2019 Shimizu et al.

FOREIGN PATENT DOCUMENTS

KR 10-2018-0001362 A 1/2018
WO 2017/170378 A1 10/2017

OTHER PUBLICATIONS

International Search Report issued in corresponding International Patent Application No. PCT/JP2019/007921, dated May 28, 2019, with English translation.
Extended European Sarch Report issued in corresponding European Patent Application No. 19775944.2, dated Apr. 16, 2021.

* cited by examiner

US 12,091,359 B2

SEALING HEAD FOR MANUFACTURING GLASS PANEL UNIT AND METHOD FOR SEALING WORK IN PROGRESS OF GLASS PANEL UNIT

CROSS REFERENCE TO RELATED APPLICATIONS

This application is the U.S. National Phase under 35 U.S.C. § 371 of International Application No. PCT/JP2019/007921, filed on Feb. 28, 2019, which in turn claims the benefit of Japanese Application No. 2018-069720, filed on Mar. 30, 2018, the entire contents of each are hereby incorporated by reference .

TECHNICAL FIELD

The present disclosure relates to a sealing head for manufacturing a glass panel unit and a method for sealing a work in progress of the glass panel unit.

BACKGROUND ART

A thermally insulating glass panel unit is manufacturable by: evacuating an internal space between a pair of substrates arranged to face each other; and sealing the internal space with the internal space being kept evacuated.

Patent Literature 1 discloses a technique by which an exhaust pipe made of glass is connected to an evacuation port formed in one of a pair of substrates, an internal space between the pair of substrates is evacuated through the exhaust pipe, and the exhaust pipe is then heated and cut off.

A trace of the exhaust pipe thus cut off protrudes from and is left on an outer surface of a glass panel unit formed by this technique.

CITATION LIST

Patent Literature

Patent Literature 1: JP 2001-354456 A

SUMMARY OF INVENTION

It is an object of the present disclosure to manufacture a glass panel unit having an evacuated internal space by a method which leaves no trace of an exhaust pipe.

A sealing head for manufacturing glass panel unit according to one aspect of the present disclosure includes: a frame to be detachably attached to a work in progress of the glass panel unit; an intake unit supported by the frame; a pressing pin supported by the frame; and a non-contact heater supported by the frame.

The work in progress includes: a first substrate including a glass panel and having an evacuation port; a second substrate including a glass panel; a bonding part having a frame shape and hermetically bonding together the first substrate and the second substrate located to face each other; and an internal space formed by being surrounded by the first substrate, the second substrate, and the bonding part. The internal space is communicated with the evacuation port.

The intake unit is configured to suck in air from the internal space through the evacuation port. The pressing pin is configured to press, toward the second substrate, a sealing material which is heat fusible and which is inserted into the evacuation port to seal the evacuation port. The non-contact heater is configured to locally heat the sealing material in a non-contact manner via the second substrate. The intake unit, the pressing pin, and the non-contact heater are, integrally with the frame, detachably attached to the work in progress.

A method for sealing work in progress of a glass panel unit according to one aspect of the present disclosure includes detachably attaching the sealing head to a corner of the work in progress; and evacuating the internal space and sealing the evacuation port by using the sealing head.

DESCRIPTION OF EMBODIMENTS

One Embodiment

A method for manufacturing a glass panel unit by using a sealing head of one embodiment will be described with reference to the attached drawings.

The method for manufacturing the glass panel unit of the one embodiment includes an arrangement step, a bonding step, an evacuation step, and a sealing step.

In the method for manufacturing the glass panel unit of the present embodiment, the arrangement step and the bonding step are performed to form a work in progress 8. The work in progress 8 is an intermediate product obtained during the manufacturing process of the glass panel unit. The work in progress 8 is subjected to the evacuation step and the sealing step performed by using a sealing head 9 for manufacturing the glass panel unit, thereby forming the glass panel unit having thermal insulation properties.

First of all, the arrangement step will be described.

Figure 1:
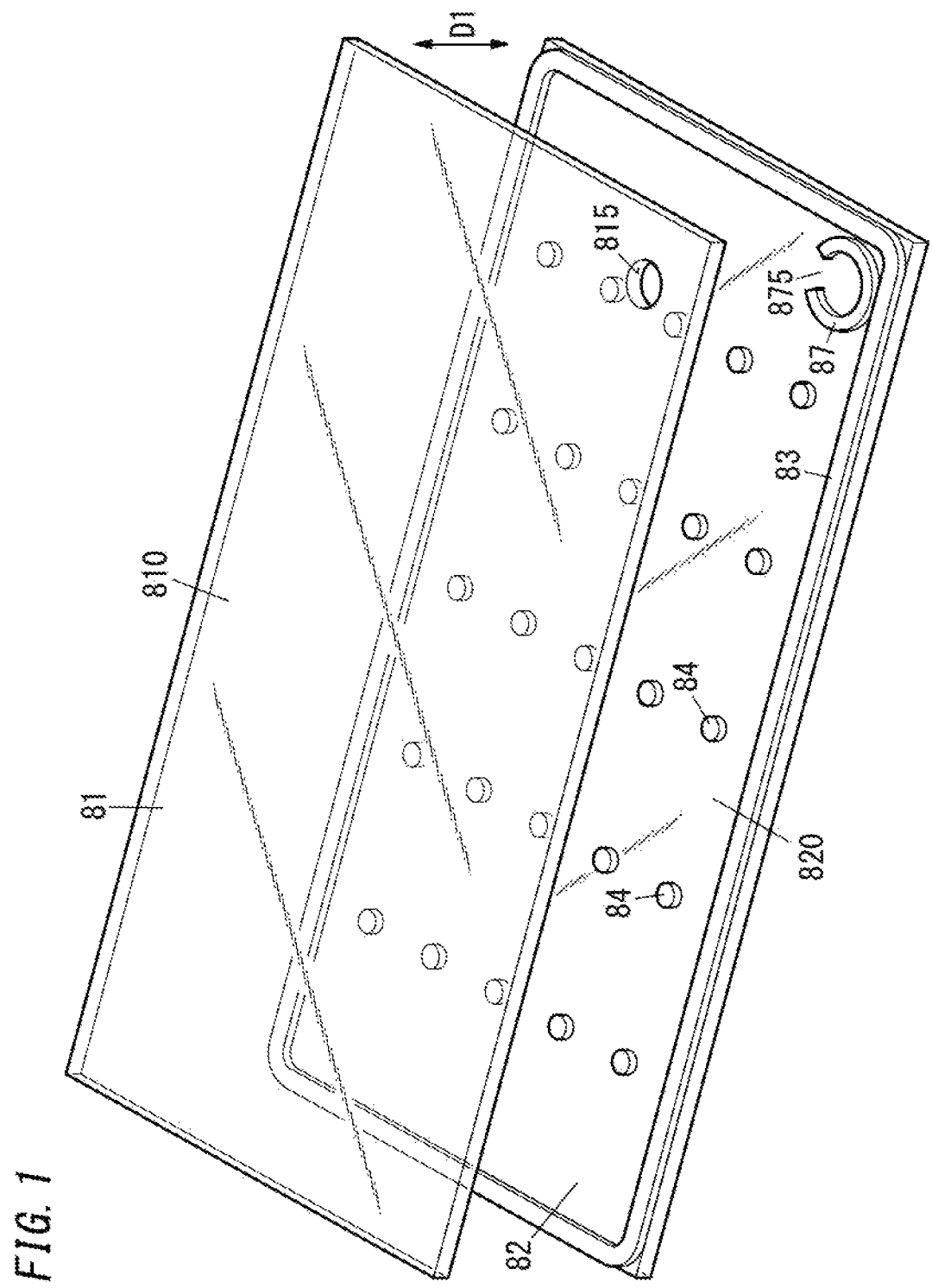
FIG. 1 is a perspective view illustrating an arrangement step for manufacturing a glass panel unit of one embodiment.

As illustrated in FIG. 1 and the like, in the arrangement step, a first substrate 81, a second substrate 82, a bonding material 83, a plurality of pillars 84, and a dam 87 are arranged at prescribed locations. Specifically, the bonding material 83, the dam 87, and the plurality of pillars 84 are arranged on one surface (i.e., an upper surface) of the second substrate 82. Above the second substrate 82, the first substrate 81 is disposed to face the second substrate 82.

The first substrate 81 includes a glass panel 810 having a light transmitting property. The second substrate 82 includes a glass panel 820 having a light transmitting property. In the following description, the glass panel 810 included in the first substrate 81 is referred to as a first glass panel 810, and the glass panel 820 included in the second substrate 82 is referred to as a second glass panel 820.

The first glass panel 810 has one surface (a lower surface) on which a low-emissivity film 812 is laid (see FIG. 3). the first substrate 81 has a surface which faces the second substrate 82 and which is mostly constituted by a surface of the low-emissivity film 812. The second substrate 82 has a surface which faces the first substrate 81 and which is constituted by a surface of the second glass panel 820.

The first substrate 81 has an evacuation port 815 penetrating therethrough. The evacuation port 815 penetrates through the first glass panel 810 in a thickness direction D1 of the first glass panel 810.

The low-emissivity film 812 is laid on not to cover the entirety of the one surface of the first glass panel 810. A peripheral edge part of the entirety of the one surface of the first glass panel 810 and a peripheral edge part of the evacuation port 815 of the one surface of the first glass panel 810 are not covered with the low-emissivity film 812.

The bonding material 83 is disposed on the second substrate 82 (i.e., the second glass panel 820) with an application apparatus such as a dispenser. As illustrated in FIG. 1, the bonding material 83 is disposed to have a frame shape along an outer peripheral edge of the one surface (i.e., the upper surface) of the second substrate 82.

Similarly, the dam 87 is disposed on the second substrate 82(i.e., the second glass panel 820) with an application apparatus such as a dispenser. The dam 87 is disposed at a prescribed location on the one surface of the second substrate 82 to have an annular shape having a cut-out 875. A material for the bonding material 83 and a material for the dam 87 are preferably the same material (for example, glass frit). The dam 87 has a C-shape having the cut-out 875, but the shape of the dam 87 is not limited to this example.

The plurality of pillars 84 are regularly distributed and arranged in an area surrounded by the bonding material 83 on the one surface of the second substrate 82. The dimensional shape, the number, and the arrangement of the plurality of pillars 84 are not particularly limited.

Next, the bonding step will be described.

In the bonding step, the first substrate 81 and the second substrate 82 disposed to face each other in the arrangement step are hermetically bonded together via the bonding material 83.

Specifically, in the arrangement step, the first substrate 81 and the second substrate 82 disposed to face each other with the bonding material 83, the dam 87, and the plurality of pillars 84 sandwiched therebetween are heated in a bonding furnace such as a circulating hot air oven, and the bonding material 83 is once melted and is then cured. In this way, the bonding material 83 becomes a bonding part 86 having a frame shape and hermetically bonding peripheral edges of the first substrate 81 and the second substrate 82 together.

Figure 3:
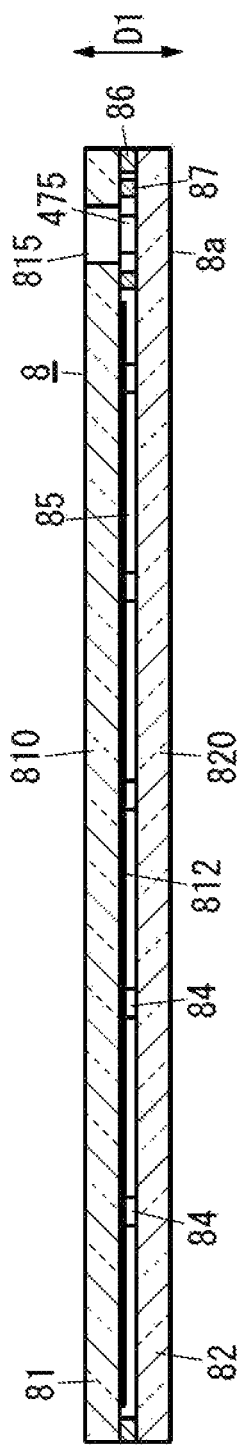
FIG. 3 is a schematic sectional view taken along line A-A of FIG. 2.
Figure 4:
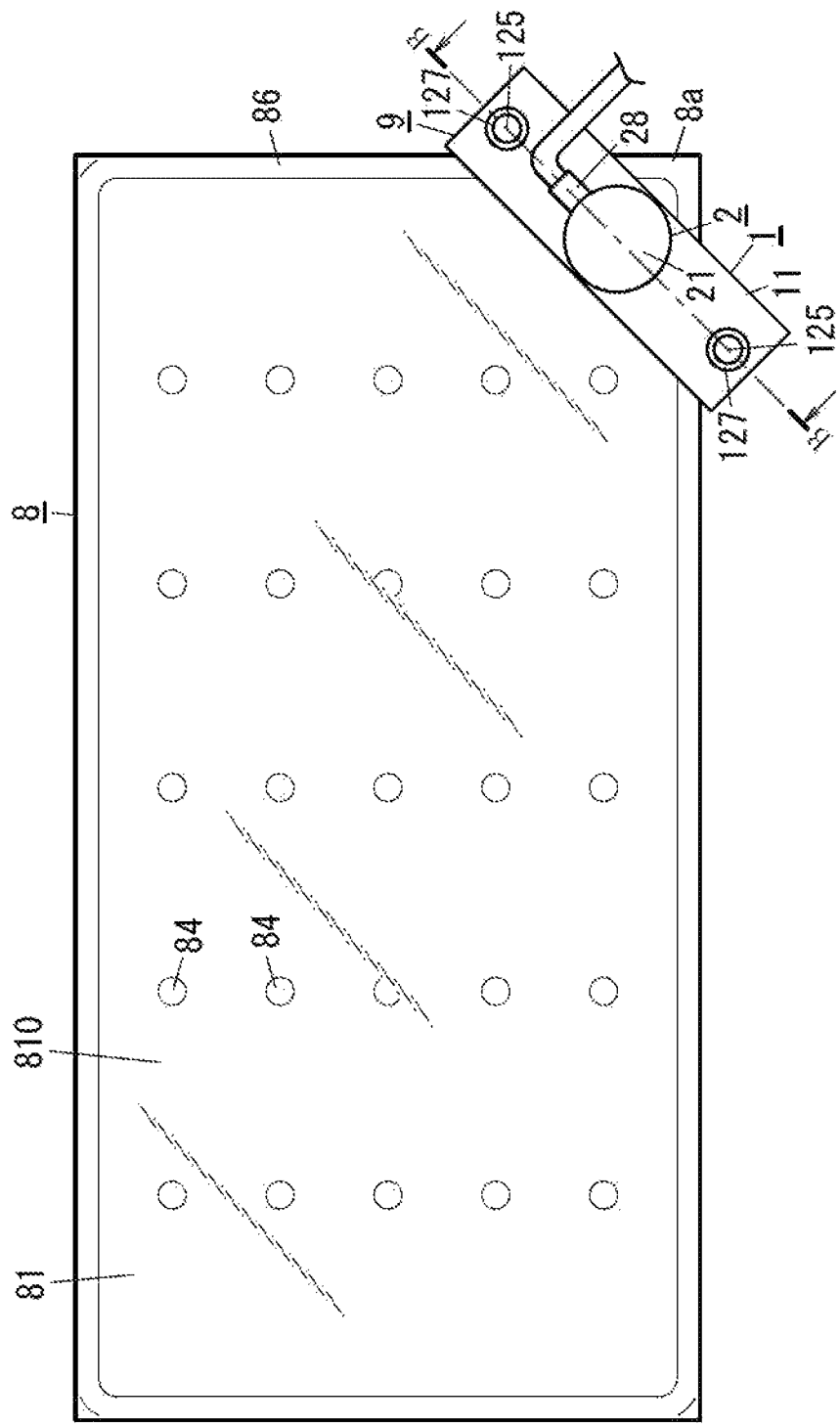
FIG. 4 is a plan view illustrating an evacuation step for manufacturing the glass panel unit.

The bonding step forms an internal space 85 between the first substrate 81 and the second substrate 82 (see, for example, FIG. 3). The internal space 85 is a space surrounded by the first substrate 81, the second substrate 82, and the bonding part 86 and is communicated with an external space via only the evacuation port 815.

A work in progress 8 is formed as a result of the arrangement step and the bonding step described above.

Figure 2:
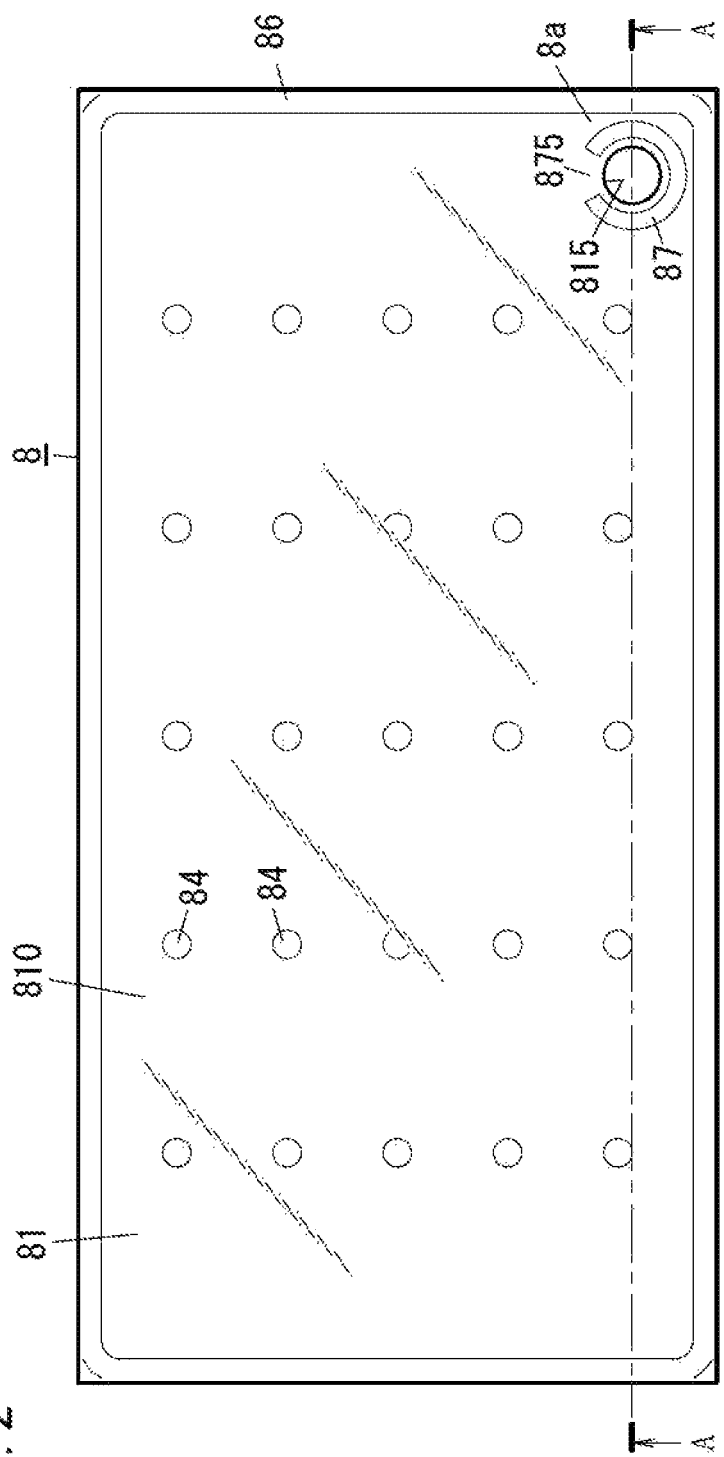
FIG. 2 is a plan view illustrating the arrangement step and a bonding step for manufacturing the glass panel unit.

When the work in progress 8 is viewed in the thickness direction D1, the evacuation port 815 of the first substrate 81 is located to be surrounded by the dam 87 (see FIG. 2).

In the work in progress 8, the thickness direction D1 is a thickness direction of the first substrate 81 and is, at the same time, a thickness direction of the second substrate 82, and is a thickness direction of the entirety of the work in progress 8.

In the work in progress 8, the first substrate 81 including the first glass panel 810 and having the evacuation port 815 and the second substrate 82 including the second glass panel 820 are hermetically bonded together via the bonding part 86 having the frame shape. Between the first substrate 81 and the second substrate 82, the internal space 85 is formed by being surrounded by the bonding part 86. In the internal space 85, the dam 87 having the cut-out 875 is disposed to surround an opening formed by the evacuation port 815.

The work in progress 8 has a rectangular outer shape when viewed in the thickness direction D1. When the work in progress 8 is viewed in the thickness direction D1, the first substrate 81 and the second substrate 82 each have a rectangular outer shape. The evacuation port 815 and the dam 87 are located at a corner 8a when the work in progress 8 is viewed in the thickness direction D1.

The dam 87 is bonded to the first substrate 81 by being cured after melted once by being heated in the bonding step, but the dam 87 may be bonded to the second substrate 82.

In the present embodiment, the cut-out 875 is formed at one part of the dam 87, but a plurality of cut-outs may be formed at intervals in a circumferential direction of the dam 87. In the present embodiment, the cut-out 875 is formed to divide the dam 87 but is not limited to this example. For example, part of the dam 87 in the circumferential direction may be formed to be recessed with respect to the remaining part of the dam 87. The part (i.e., the part recessed with respect to the remaining part) may also be used as a cut-out.

The work in progress 8 is subjected to a process of sealing the evacuation port 815 while the internal space 85 is maintained in an evacuated state, thereby manufacturing a glass panel unit having thermal insulation properties. That is, the glass panel unit having the thermal insulation properties is manufactured by further performing the evacuation step and the sealing step on the work in progress 8.

The evacuation step and the sealing step are performed in this order with the sealing head 9 shown in FIGS. 4 to 7. The sealing head 9 is detachably attached to the corner 8a, which is right-angled, of the work in progress 8.

The structure of the sealing head 9 will be described below.

Figure 5:
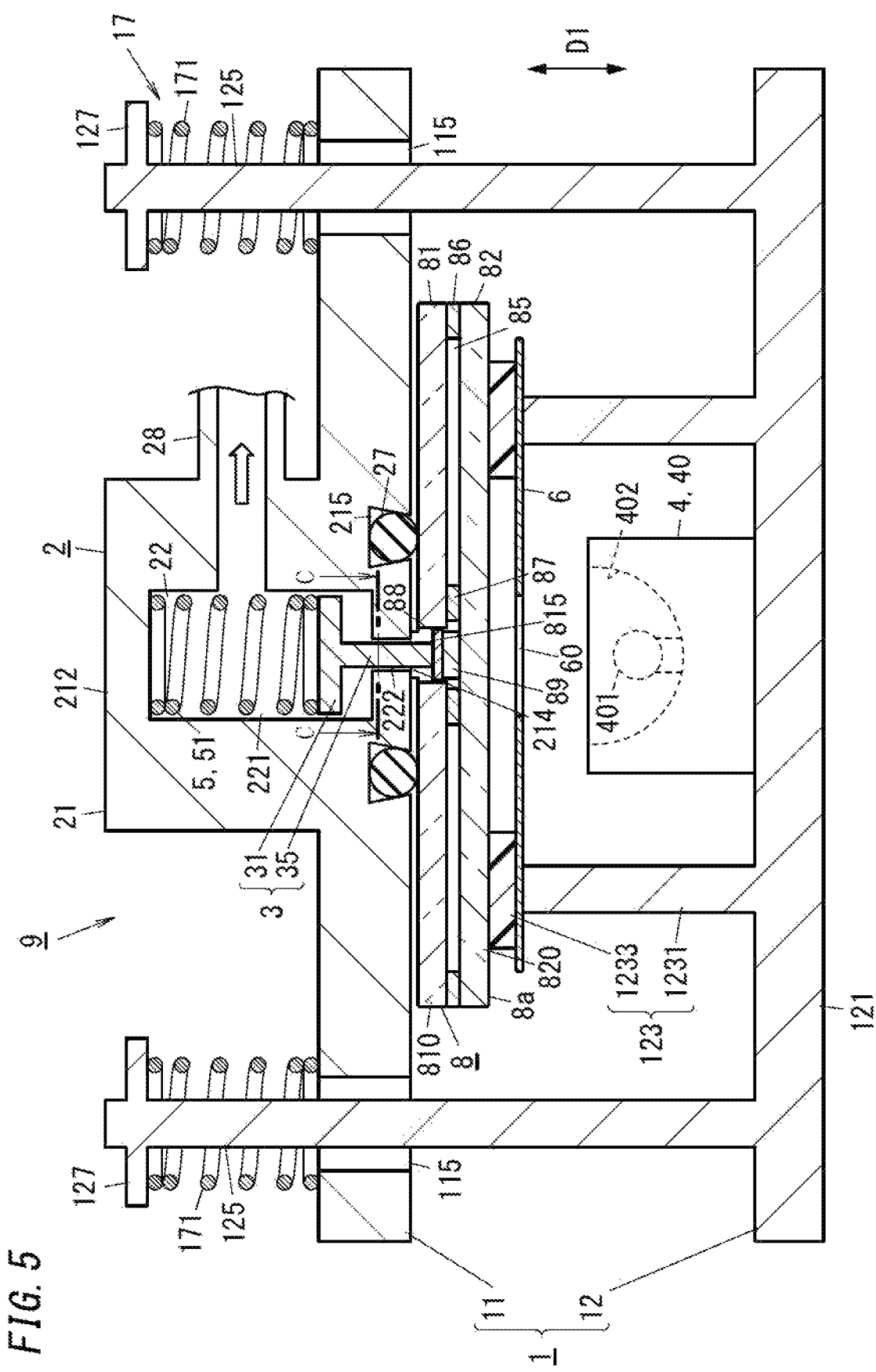
FIG. 5 is a schematic sectional view taken along line B-B of FIG. 4.
Figure 6:
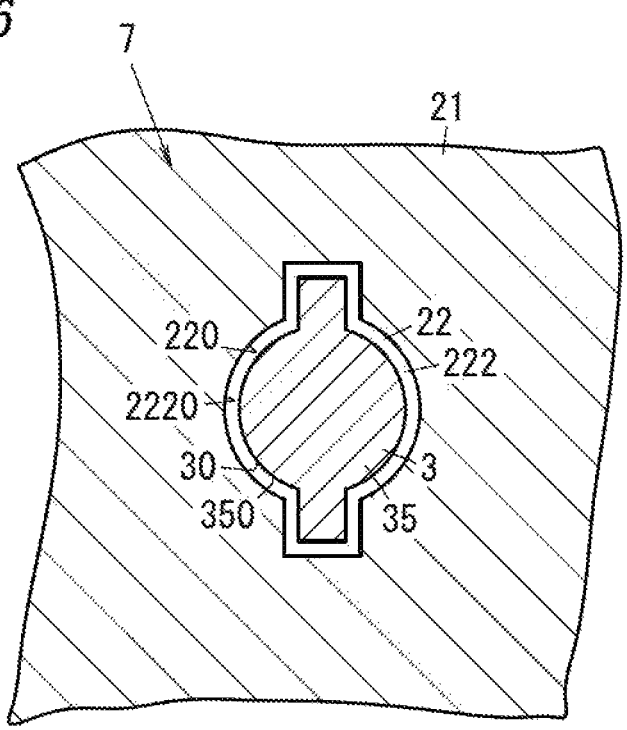
FIG. 6 is a schematic sectional view taken along line C-C of FIG. 5.

As illustrated in FIG. 5 and the like, the sealing head 9 integrally includes: an evacuation mechanism configured to evacuate the internal space 85 of the work in progress 8; a sealing mechanism configured to seal the internal space 85 with the internal space 85 being kept evacuated, and a frame 1 supporting these mechanisms. The evacuation mechanism is a mechanism including an intake unit 2 described later. The sealing mechanism is a mechanism including the pressing pin 3 and the non-contact heater 4 described later.

The frame 1 is detachably attached to the corner 8a, and thereby, the intake unit 2, the pressing pin 3, and the non-contact heater 4 are detachably attached to the corner 8a.

The frame 1 includes a first frame 11 pressed against the corner of the first substrate 81 from above and a second frame 12 pressed against the corner of the second substrate 82 from below.

The first frame 11 integrally supports the intake unit 2 having a tubular shape and having an intake path 22 therein. The intake unit 2 has a function of sucking in air from the internal space 85 through the evacuation port 815 of the work in progress 8. The intake unit 2 is configured to evacuate the internal space 85 through the evacuation port 815 and maintain the internal space 85 in the evacuated state.

The intake unit 2 includes: a hollow body 21 having a bottomed cylindrical shape having a bottom 212 on an upper side and having an opening 214 on a lower side; and a connector 28 having a pipe shape laterally extending from the hollow body 21. The internal space of the hollow body 21 forms the intake path 22. The hollow body 21 at least includes the intake path 22 and the opening 214, and the shape of the hollow body 21 is not particularly limited. The interior flow path of the connector 28 is connected to an intake device not illustrated in the figure.

The intake path 22 includes a first intake path 221 located at an upper side (i.e., a side facing the bottom 212) and a second intake path 222 located on a lower side (i.e., a side away from the opening 214) in series. The first intake path 221 is communicated with the interior flow path of the connector 28. The second intake path 222 is communicated with the opening 214 of the hollow body 21. The second intake path 222 has a cross-sectional area smaller than the cross-sectional area of the first intake path 221 and has a step formed on a border between the first intake path 221 and the second intake path 222.

In the intake path 22, the pressing pin 3 is freely movably disposed. The pressing pin 3 integrally includes a base 31 having a plate shape and a pin body 35 having a columnar shape and protruding downward from part of the base 31.

The base 31 is located in the first intake path 221. In the first intake path 221, a gap which can be ventilated is provided around the base 31. Part of the pin body 35 is located in the second intake path 222. In the second intake path 222, a gap which can be ventilated is provided around the pin body 35.

The pressing pin 3 is guided by an inner peripheral surface 2220 of the second intake path 222 and is freely movable in upward and downward directions (i.e., directions toward and away from the second substrate 82). The rotation of the pressing pin 3 with respect to the first frame 11 is restricted by a detent structure 7 shown in FIG. 6.

The detent structure 7 is formed by an outer peripheral surface 30 of the pressing pin 3 and an inner peripheral surface 220 of the intake path 22. The outer peripheral surface 30 of the pressing pin 3 forming part of the detent structure 7 is an outer peripheral surface 350 of the pin body 35, and the cross section of the outer peripheral surface 350 is non-circular. The inner peripheral surface 220 of the intake path 22 forming another part of the detent structure 7 is the inner peripheral surface 2220 of the second intake path 222, and the cross section of the inner peripheral surface 2220 is non-circular.

In the sealing head 9 of the present embodiment, a plurality of (the present embodiment two) elongated protrusions are provided to the outer peripheral surface 350 of the pin body 35, and The inner peripheral surface 2220 of the second intake path 222 has a plurality of (the present embodiment two) grooves in which the plurality of elongated protrusions are to be fit in a freely movable manner in the upward and downward directions. The shapes of the pin body 35 and the second intake path 222 are not limited to these examples but may be any shapes as long as they engage with each other such that relative rotation is impossible.

In the first intake path 221 shown in FIG. 5, a spring member 51 in a compressed state is further accommodated. The spring member 51 is pressed against the bottom 212 of the hollow body 21 and is pressed against the base 31 of the pressing pin 3, thereby continuously applying downward biasing force to the base 31. The biasing force applied by the spring member 51 to the base 31 pushes out the pin body 35 downward (i.e., in a direction toward the second substrate 82) through the opening 214 of the hollow body 21.

The spring member 51 is supported by the first frame 11. In the sealing head 9 of the present embodiment, the spring member 51 forms a pin spring mechanism 5 that presses the pressing pin 3 toward the second substrate 82.

The hollow body 21 has a lower surface having a portion which surrounds the opening 214 and which has groove 215 having an annular shape. In the groove 215, an O-ring 27 which is elastic is disposed. When part of the O-ring 27 is fit in the groove 215, a remaining part of the O-ring 27 protrudes downward.

The second frame 12 integrally includes a base 121 supporting the non-contact heater 4 from below, a pressing section 123 pressing the second substrate 82 from below, and a plurality of rods 125 for coupling, the rods 125 protruding upward from the base 121.

The non-contact heater 4 is an electromagnetic wave irradiator 40 configured to radiate an electromagnetic wave for local heating. In the sealing head 9 of the present embodiment, the electromagnetic wave radiated from the electromagnetic wave irradiator 40 is an infrared ray. The electromagnetic wave irradiator 40 is configured to irradiate the sealing material 89 which is heat fusible and which is inserted into the evacuation port 815 as described later with the infrared ray through the second substrate 82 (i.e., the second glass panel 820) having the light transmitting property to locally heat the sealing material 89.

The electromagnetic wave irradiator 40 includes a heat source 401 configured to release an infrared ray and a focusing member 402 configured to focus infrared ray released from the heat source 401 onto a target location. The heat source 401 is preferably a halogen lamp for radiating a near infrared ray. When the infrared ray radiated from the electromagnetic wave irradiator 40 is a near infrared ray having a short wavelength, this provides the advantage that the near infrared ray is less likely to be absorbed while the near infrared ray passes through the second substrate 82. When the electromagnetic wave irradiator 40 outputs the near infrared ray, the sealing material 89 is preferably formed from a black material having high near infrared absorbance such that the near infrared absorbance of the sealing material 89 is higher than or equal to 30%.

The pressing section 123 is located to surround the electromagnetic wave irradiator 40 when the second frame 12 is viewed in the thickness direction D1. The pressing section 123 includes a support 1231 protruding upward from the base 121 and a contact portion 1233 supported above the base 121 by the support 1231. The contact portion 1233 is a portion that comes into contact with the second substrate 82 from below and is preferably elastic.

Moreover, the second frame 12 supports a shielding plate 6. The shielding plate 6 is a plate material capable of shielding the electromagnetic wave, that is, the infrared ray. The shielding plate 6 has a central part provided with a through hole 60 formed to allow the infrared ray to pass toward the sealing material 89.

In other words, the shielding plate 6 is a plate material which allows part, radiated toward the sealing material 89, of the infrared ray radiated from the electromagnetic wave irradiator 40 to pass therethrough and which shields at least part of the remaining part. At least part, radiated toward the O-ring 27, of the infrared ray radiated from the electromagnetic wave irradiator 40 is shielded by the shielding plate 6, and therefore, deterioration of the O-ring 27 is suppressed from progressing due to the influence of the infrared ray.

The plurality of rods 125 of the second frame 12 are inserted in a plurality of connection holes 115 formed in the first frame 11 on a one-to-one basis. Thus, the first frame 11 and the second frame 12 are relatively displaceably coupled to each other in a direction in which the first substrate 81 and the second substrate 82 face each other (i.e., in the thickness direction D1). The plurality of connection holes 115 are located to surround the hollow body 21 when the first frame 11 is viewed in the thickness direction D1.

Each of the plurality of rods 125 has a tip portion provided with a retaining part 127. The retaining part 127 has a diameter larger than the diameter of the connection hole 115. The retaining part 127 is located at a higher level than the first frame 11. Between the retaining part 127 and the first frame 11, a spring member 171 in a compressed state is provided.

The plurality of spring members 171 incorporated into the plurality of rods 125 apply biasing force to the first frame 11 and the second frame 12 in a direction in which the first frame 11 and the second frame 12 come close to each other. The plurality of spring members 171 forms a frame spring mechanism 17. The frame spring mechanism 17 urges the first frame 11 and the second frame 12 in a direction in which the first frame 11 and the second frame 12 come close to each other.

In a state where the sealing head 9 having the above-described structure is attached to the corner 8a of the work in progress 8, the evacuation step and the sealing step are performed as described below.

To attach the sealing head 9, the work in progress 8 is set such that the first substrate 81 is located above the second substrate 82. The intake unit 2 supported by the first frame 11 is set to be located above the evacuation port 815 with the opening 214 facing downward. Above the evacuation port 815, the pressing pin 3 is located.

Here, the sealing material 89 and a plate 88 are inserted into the evacuation port 815 of the work in progress 8 in advance. The sealing material 89 is, for example, a solid sealing material formed from glass frit. The plate 88 is a disk-shaped plate made of, for example, metal.

The sealing material 89 and the plate 88 each have an outer diameter smaller than the outer diameter of the evacuation port 815. The plate 88 has an outer diameter larger than the outer diameter of the sealing material 89. The plate 88 disposed at the evacuation port 815 is located on an opposite side of the sealing material 89 from the second substrate 82.

As illustrated in FIG. 5, in a state where the sealing head 9 is attached to the corner 8a, a tip end of the pin body 35 protruding downward from the opening 214 of the hollow body 21 is pressed against the upper surface of the plate 88 along with biasing force of the spring member 51. The O-ring 27 fit in a lower surface of the intake unit 2 is hermetically pressed against part, surrounding the entire perimeter of the evacuation port 815, of the upper surface of the first substrate 81.

The O-ring 27 elasticity deformed by force (in other words, biasing force applied by the plurality of spring members 171) by which the hollow body 21 is pressed against the first substrate 81 is disposed between the first substrate 81 and the hollow body 21, and thereby, the evacuation port 815 of the first substrate 81 and the intake path 22 of the hollow body 21 are communicated with each other hermetically.

At this time, the sealing material 89 and the plate 88 placed on the sealing material 89 are vertically sandwiched between the second substrate 82 and the pressing pin 3 by the biasing force applied by the spring member 51. In the evacuation step, the pin spring mechanism 5 functions as a holding mechanism that holds the sealing material 89 at the evacuation port 815.

In the evacuation step, air is sucked through the connector 28 in this state (see the void arrow in FIG. 5), thereby evacuating the internal space 85 to a degree of vacuum of, for example, 0.1 Pa or lower.

The sealing material 89 and the plate 88 are inserted in the evacuation port 815 with a gap provided between an inner peripheral surface of the evacuation port 815 and the sealing material 89 and a gap provided between the evacuation port 815 and the plate 88, and both of the gaps are communicated with each other. Thus, the air in the internal space 85 is smoothly sucked through the evacuation port 815 formed in the first substrate 81 and the cut-out 875 of the dam 87 disposed in the internal space 85.

In the sealing step, the non-contact heater 4 supported by the second frame 12 seals the internal space 85 with the internal space 85 being kept evacuated.

The non-contact heater 4 is configured to heat in a non-contact manner and locally the sealing material 89 inserted in the evacuation port 815 with the internal space 85 being kept evacuated.

When reaching a prescribed temperature, the sealing material 89 that has been locally heated melts and softens. The sealing material 89 softened is pressed toward the second substrate 82 by the biasing force (spring force) applied by the spring member 51 via the plate 88 and is thus deformed.

The sealing material 89 is pressed and expanded in a direction orthogonal to the thickness direction D1 and is deformed to the point of coming into contact with an inner peripheral face of the dam 87 in the internal space 85. Bringing the sealing material 89 into contact with the dam 87 reduces further expansion of the sealing material 89. This allows the cut-out 875 of the dam 87 to be sealed up with the sealing material 89 that has been pressed and expanded to the point of coming into contact with the dam 87.

Figure 7:
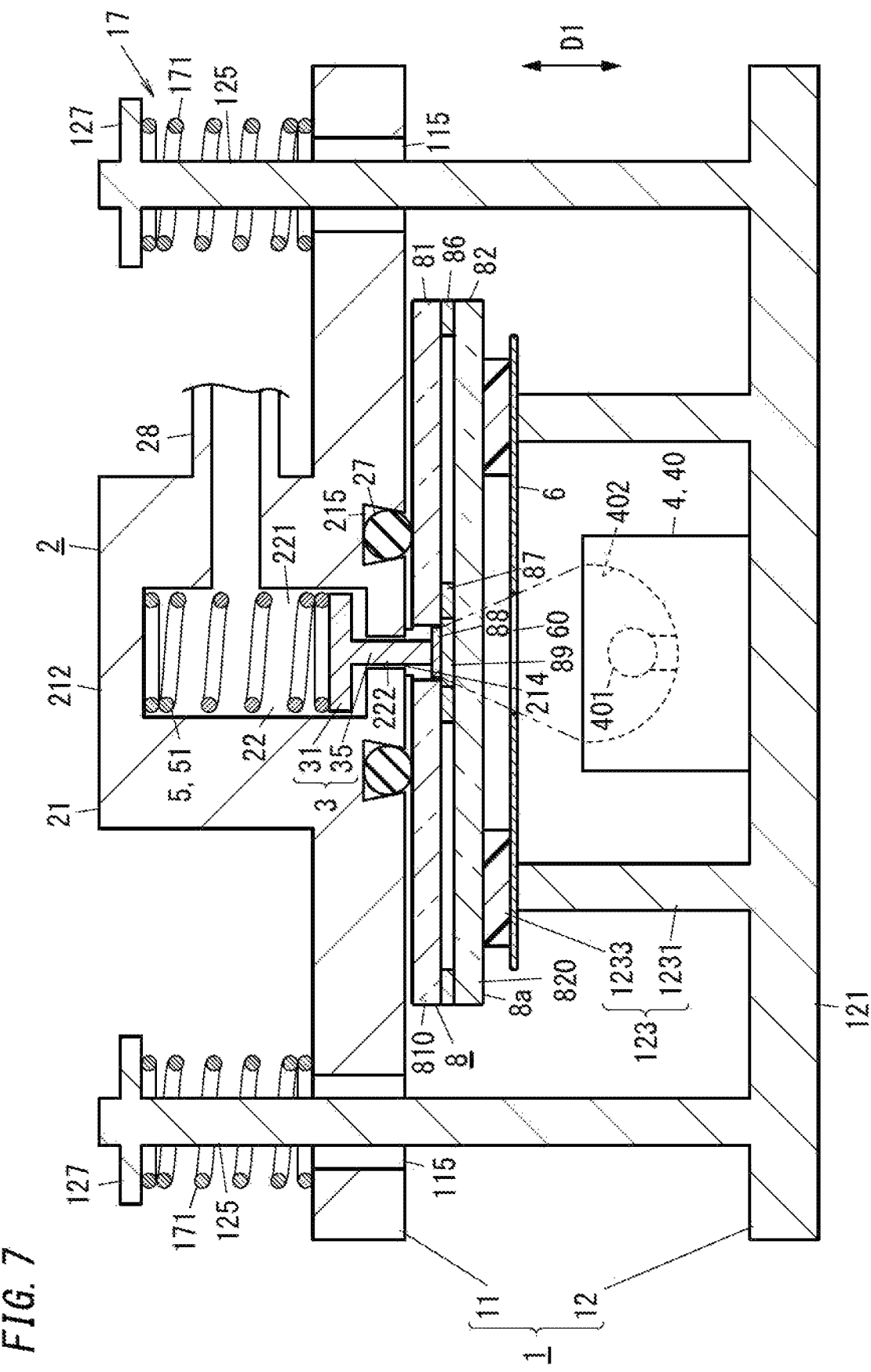
FIG. 7 is a schematic sectional view illustrating a sealing step for manufacturing the glass panel unit.

At this stage, the evacuation port 815 is sealed up with the sealing material 89, and the internal space 85 is hermetically sealed with the internal space 85 being kept evacuated. As illustrated in FIG. 7, the sealing material 89 is bonded onto both of the first substrate 81 and the second substrate 82 in the internal space 85.

A glass panel unit having the internal space 85 evacuated and sealed with the sealing head 9 of the present embodiment has no trace of the exhaust pipe remaining as described in connection with the prior art technique. This reduces the chances of the exhaust pipe traces causing damage to the glass panel unit.

Figure 8:
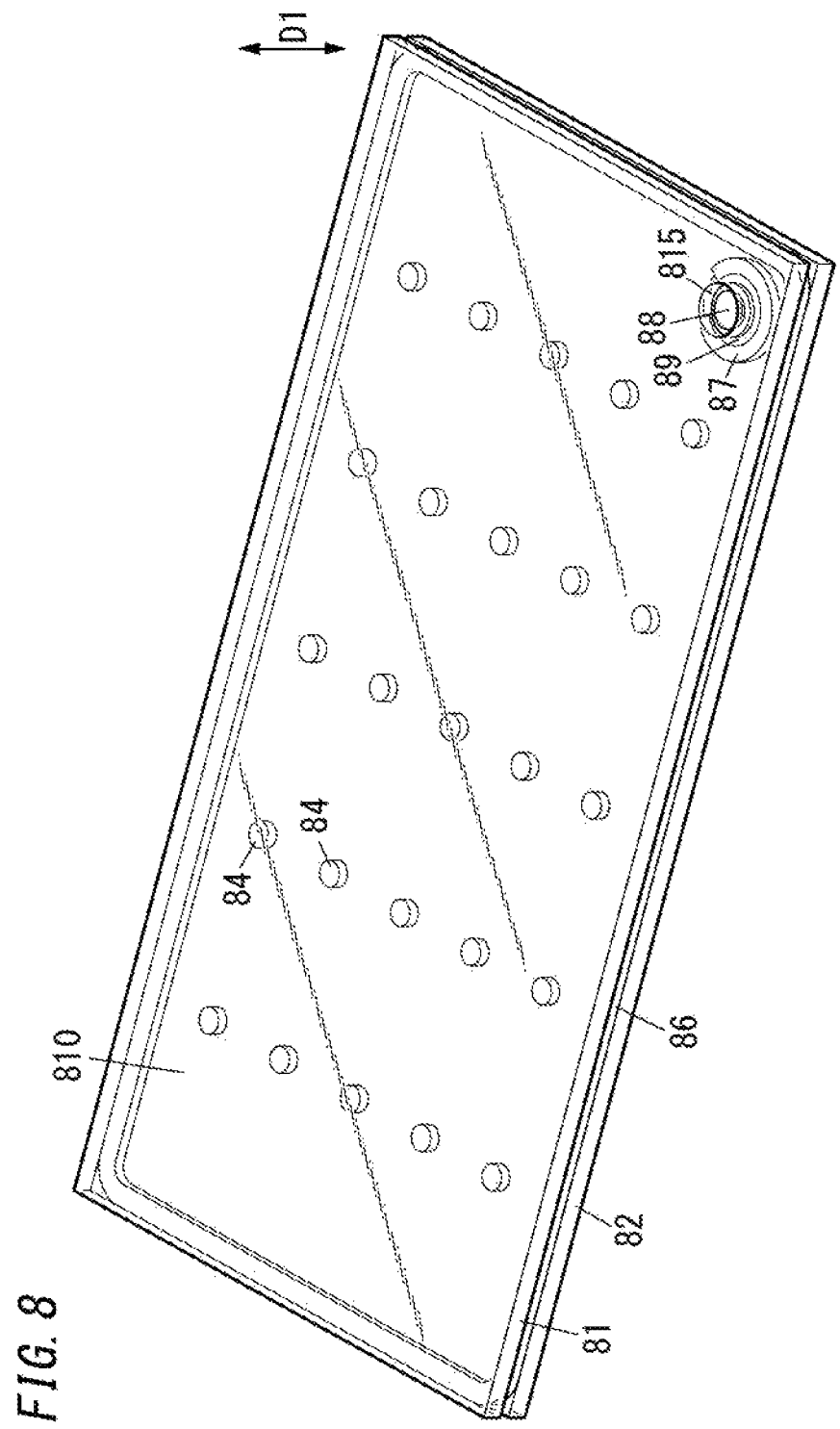
FIG. 8 is a perspective view illustrating the glass panel unit manufactured by the sealing step.

As illustrated in FIG. 8, a glass panel unit manufactured with the sealing head 9 of the present embodiment has the plate 88 remaining in the evacuation port 815, but after the evacuation port 815 is sealed, the plate 88 can be removed.

The sealing head 9 of the present embodiment and the method for manufacturing the glass panel unit with the sealing head 9 have been described above.

According to the sealing head 9 of the present embodiment, all of the intake unit 2, the pressing pin 3, the non-contact heater 4 can be detachably attached to the corner 8a of the work in progress 8 integrally with the frame 1. The corner 8a is provided with the evacuation port 815. Thus, a simple process of attaching and detaching the frame 1 to and from the corner 8a enables evacuation of the internal space 85 of the work in progress 8 and sealing of the internal space 85 with the internal space 85 being kept evacuated, and in addition, no trance of the exhaust pipe remains unlike the prior art technique.

As illustrated in FIG. 7 and the like, in the sealing head 9 of the present embodiment, the frame 1 supports the pressing pin 3 and the non-contact heater 4 at locations on opposing sides with the second substrate 82 of the work in progress 8 provided between the pressing pin 3 and the non-contact heater 4. The non-contact heater 4 is configured to locally heat the sealing material 89 in a non-contact manner through the second substrate 82. Thus, while the pressing pin 3 applies a load to the sealing material 89, the sealing material 89 can be melted by being heated with the infrared ray output from an opposite side of the pressing pin 3, and a process of sealing the internal space 85 can be efficiency performed.

In addition, in the sealing head 9 of the present embodiment, the first frame 11 supporting the intake unit 2 and the pressing pin 3 and the second frame 12 supporting the non-contact heater 4 are urged by the frame spring mechanism 17 in a direction in which the first frame 11 and the second frame 12 come close to each other. Thus, the frame 1 including the first frame 11 and the second frame 12 can be easily set in a form in which the work in progress 8 is sandwiched from both sides of the work in progress 8 in the thickness direction D1. In addition, when evacuation of the internal space 85 causes a change in the dimension of the work in progress 8 in the thickness direction D1, the distance between the first frame 11 and the second frame 12 necessarily changes along with the change.

Variation

Next, variations of the sealing head 9 will be described. hi the following description of the variations, components already described in the embodiment are denoted by the same reference signs, and the description thereof is omitted.

Figure 9A:
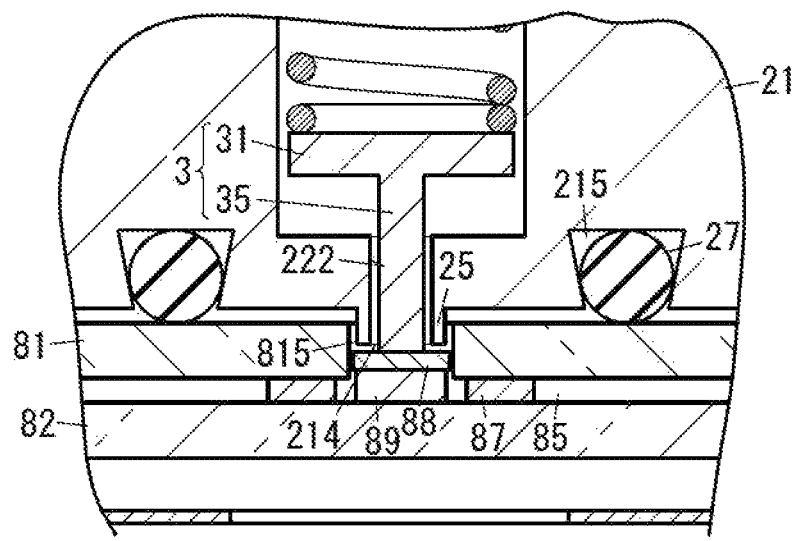
FIG. 9A is a sectional view illustrating a main part for illustrating an evacuation step performed by using a first variation of the sealing head.
Figure 9B:
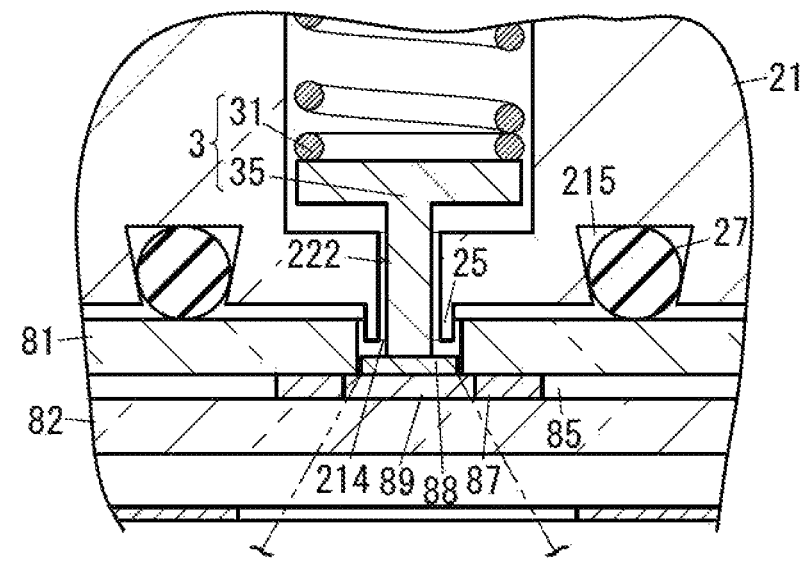
FIG. 9B is a sectional view illustrating a main part for illustrating a sealing step performed by using the first variation of the sealing head.

FIGS. 9A and 9B shows a main part of a first variation of the sealing head 9. In the first variation, a hollow body 21 further includes a projection 25 inserted in an evacuation port 815. The projection 25 is an annular projection formed on a lower surface of the hollow body 21 to surround an opening 214. Between the projection 25 having an annular shape and a pin body 35 having a columnar shape, a space which can be ventilated is formed. The projection 25 is continuously formed in its circumferential direction but may be intermittently formed.

In a state where an intake unit 2 is pressed against a first substrate 81 (specifically, in a state where an O-ring 27 is pressed against the first substrate 81), at least tip end-side part of the projection 25 is inserted into the evacuation port 815.

In this state, the internal space 85 is evacuated via the intake unit 2, and the sealing material 89 is locally heated with the internal space 85 being kept in the evacuated state, and thereby, a sealing material 89 is crushed by a tip end of a pressing pin 3 and deforms such that the sealing material 89 after the deformation seals the evacuation port 815 (see FIG. 9B).

Here, even when the sealing material 89 crushed extends above the plate 88, the projection 25, which is inserted in the evacuation port 815 in the first variation, functions to suppress the extension of the sealing material 89. Thus, in the first variation, the sealing material 89 melted by being heated is suppressed from attaching to the pressing pin 3.

In the sealing step, when the sealing material 89 melted by being heated attaches the pressing pin 3, a worker at least holds a first frame 11 and rotates the first frame 11 about an axis of the pressing pin 3 as the center after the sealing step is completed. The detent structure 7 shown in FIG. 6 restricts relative rotation of the pressing pin 3 and the first frame 11, and therefore, when the first frame 11 is rotated, the pressing pin 3 rotates along with the first frame 11. Thus, a portion of the sealing material 89 attached to the pressing pin 3 peels off from the pressing pin 3.

Also when the hollow body 21 does not include the projection 25, the sealing material 89, which is melted by being heated, may attach to the pressing pin 3, but the sealing material 89 can be peeled off from the pressing pin 3 by a similar process.

Figure 10:
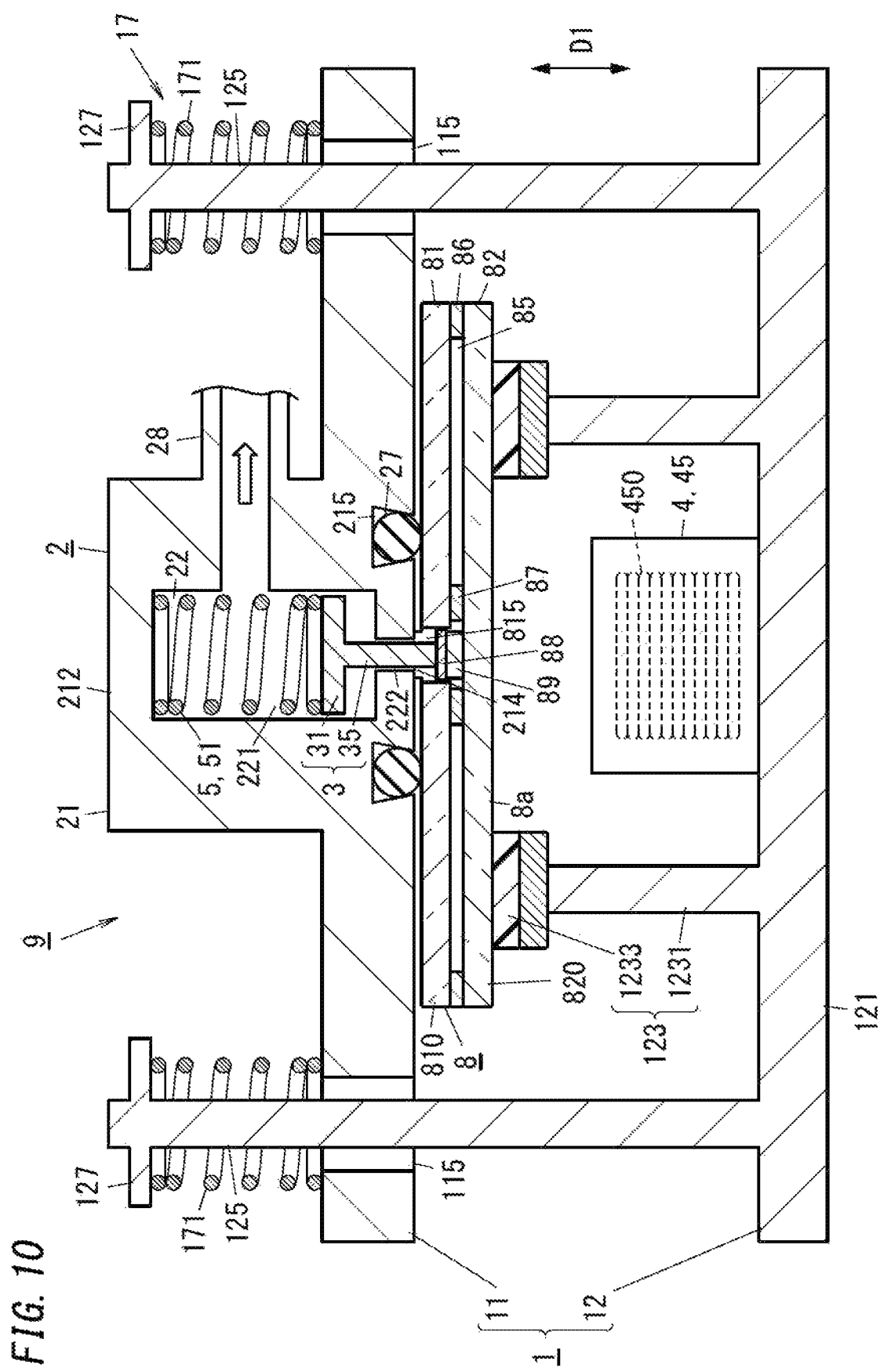
FIG. 10 is a schematic sectional view illustrating an evacuation step performed by using a second variation of the sealing head.

FIG. 10 shows a second variation of the sealing head 9.

In the second variation, a non-contact heater 4 supported by a base 121 of a second frame 12 is a magnetic field generator 45 including a coil 450 that generates a magnetic field for induction heating.

In the second variation, the coil 450 of the magnetic field generator 45 is supplied with alternating-current power. Thus, an overcurrent is generated at a plate 88 including a conductor (i.e., having a conductive property), and the plate 88 is heated by induction heating to a prescribed temperature. A sealing material 89 inserted in the evacuation port 815 is locally heated via the plate 88 at which heat is generated by the induction heating.

Also in the second variation, a work in progress 8 is evacuated and sealed while no trance of the exhaust pipe remains unlike the prior art technique.

In the components other than the sealing head 9, design modification may accordingly be made.

For example, in the above-described embodiment, the electromagnetic wave irradiator 40 radiates an infrared ray, but as long as the sealing material 89 can be locally heated through the second substrate 82, the electromagnetic wave irradiator 40 may radiate an electromagnetic wave of a different type from the infrared ray. The shielding plate 6 has at least a property that shields the electromagnetic wave of the different type.

In the above-described embodiment, the pressing pin 3 is pressed against the sealing material 89 via the plate 88, but the plate 88 is not essential, and the pressing pin 3 may be directly pressed against the sealing material 89.

In the above-described embodiment, the dam 87 is provided in the internal space 85 of the work in progress 8, but the dam 87 is not essential. Without providing the dam 87 in the internal space 85, the evacuation port 815 may be sealed by crushing the sealing material 89 with the pressing pin 3.

In the above-described embodiment, the evacuation port 815 is provided at one corner of four corners of the first substrate 81 of the work in progress 8, but evacuation ports 815 may be provided at the plurality of corners. In this case, the internal space 85 may be evacuated and sealed by adopting a plurality of sealing heads 9 and attaching the sealing heads 9 at the respective corners.

The plurality of pillars 84 are provided in the internal space 85 of the work in progress 8, but these pillars 84 are not essential. In the above-described embodiment, the internal space 85 is evacuated to a degree of vacuum of 0.1 Pa or lower, but the degree of evacuation of the internal space 85 is not limited to this example.

Aspects

As can be seen from the description of the above-described embodiment and variations, a sealing head (9) of a first aspect includes a frame (1), an intake unit (2), a pressing pin (3), and a non-contact heater (4). The frame (1) is configured to be detachably attached to a work in progress (8) of a glass panel unit. The intake unit (2), the pressing pin (3), and the non-contact heater (4) are supported by the frame (1).

The work in progress (8) includes a first substrate (81), a second substrate (82), a bonding part (86), and an internal space (85). The first substrate (81) includes a glass panel (810) and has an evacuation port (815). The second substrate (82) includes a glass panel (820). The bonding part (86) hermetically bonds together the first substrate (81) and the second substrate (82) located to face each other. The internal space (85) is formed by being surrounded by the first substrate (81), the second substrate (82), and the bonding part (86). The internal space (85) is communicated with the evacuation port (815).

The intake unit (2) is configured to suck in air from the internal space (85) through the evacuation port (815). The pressing pin (3) is configured to press, toward the second substrate (82), a sealing material (89) which is heat fusible and which is inserted into the evacuation port (815) to seal the evacuation port (815). The non-contact heater (4) is configured to locally heat the sealing material (89) in a non-contact manner via the second substrate (82). The intake unit (2), the pressing pin (3), and the non-contact heater (4) are, integrally with the frame (1), detachably attached to the work in progress (8).

With the sealing head (9) of the first aspect, the internal space (85) of the work in progress (8) is evacuated and the evacuation port (815) is sealed with the sealing head (9), and in addition, no trance of an exhaust pipe remains unlike the prior art technique. To perform the evacuation and the sealing, the frame (1) is at least attached to the work in progress (8), and the frame (1) is detached from the work in progress (8) after completion of the sealing. Thus, no complicated process is required.

A sealing head (9) of a second aspect is realized in combination with the first aspect. In the sealing head (9) of the second aspect, in a state where the frame (1) is attached to the work in progress (8), the pressing pin (3) and the non-contact heater (4) are configured to be located on opposing sides with the second substrate (82) provided between the pressing pin (3) and the non-contact heater (4).

With the sealing head (9) of the second aspect, in the state where the frame (1) is attached to the work in progress (8), the pressing pin (3) presses the sealing material (89) against the second substrate (82), and the sealing material (89) is locally heated through the second substrate (82).

A sealing head (9) of a third aspect is realized in combination with the first or second aspect. In the sealing head (9) of the third aspect, the frame (1) includes a first frame (11), a second frame (12), and a frame spring mechanism (17). The first frame (11) supports the intake unit (2) and the pressing pin (3). The second frame (12) supports the non-contact heater (4). The frame spring mechanism (17) is configured to urge the first frame (11) and the second frame (12) in a direction in which the first frame (11) and the second frame (12) come close to each other.

With the sealing head (9) of the third aspect, for example, if the evacuation step causes a change in the thickness of the work in progress (8), the distance between the first frame (11) and the second frame (12) necessarily changes along with the change.

A sealing head (9) of a fourth aspect is realized in combination with the first or second aspect. The sealing head (9) of the fourth aspect further includes a pin spring mechanism (5). The pin spring mechanism (5) is supported by the frame (1) and is configured to press the pressing pin (3) toward the second substrate (82).

With the sealing head (9) of the fourth aspect, in the sealing step, the pressing pin (3) comes close to the second substrate (82) as the sealing material (89) is crushed, and therefore, the pressing pin (3) stably applies a load to the sealing material (89).

A sealing head (9) of a fifth aspect is realized in combination with the third aspect. The sealing head (9) of the fifth aspect further includes a pin spring mechanism (5). The pin spring mechanism (5) is supported by the first frame (11) and is configured to press the pressing pin (3) toward the second substrate (82).

With the sealing head (9) of the fifth aspect, in the sealing step, the pressing pin (3) comes close to the second substrate (82) as the sealing material (89) is crushed, and therefore, the pressing pin (3) stably applies a load to the sealing material (89).

A sealing head (9) of a sixth aspect is realized in combination with any one of the first, second, and fourth aspects. The sealing head (9) of the sixth aspect, further includes a shielding plate (6) supported by the frame (1). The non-contact heater (4) is an electromagnetic wave irradiator (40). The shielding plate (6) is configured to transmit part, directed to the sealing material (89), of an electromagnetic wave radiated from the electromagnetic wave irradiator (40) and shield at least part of a remaining part of the electromagnetic wave.

With the sealing head (9) of the sixth aspect, the electromagnetic wave radiated from the electromagnetic wave irradiator (40) is suppressed from being radiated to members other than the sealing material (89), and thereby, the sealing head (9) is suppressed from being deteriorated due to the influence of the electromagnetic wave.

A sealing head (9) of a seventh aspect is realized in combination with the third or fifth aspect. The sealing head (9) of the seventh aspect, further includes a shielding plate (6) supported by the second frame (12). The non-contact heater (4) is an electromagnetic wave irradiator (40). The shielding plate (6) is configured to transmit part, directed to the sealing material (89), of an electromagnetic wave radiated from the electromagnetic wave irradiator (40) and shield at least part of a remaining part of the electromagnetic wave.

With the sealing head (9) of the seventh aspect, the electromagnetic wave radiated from the electromagnetic wave irradiator (40) is suppressed from being radiated to members other than the sealing material (89), and thereby, the sealing head (9) is suppressed from being deteriorated due to the influence of the electromagnetic wave.

A sealing head (9) of an eighth aspect is realized in combination with the sixth or seventh aspect. In the sealing head (9) of the eighth aspect, the intake unit (2) includes a hollow body (21) having an intake path (22) and an opening (214) communicated with the intake path (22); and an O-ring (27) provided to the hollow body (21) to be located to surround the opening (214). The intake unit (2) is configured such that in a state where the O-ring (27) is in contact with the first substrate (81), the intake path (22) and the evacuation port (815) are hermetically communicated with each other via the O-ring (27). The shielding plate (6) is configured to shield part, radiated toward the O-ring (27), of the electromagnetic wave.

With the sealing head (9) of the eighth aspect, the O-ring (27) is suppressed from being irradiated with the electromagnetic wave radiated from the electromagnetic wave irradiator (40), thereby reducing deterioration of the O-ring (27).

A sealing head (9) of a ninth aspect is realized in combination with any one of the sixth to eighth aspects. In the sealing head (9) of the ninth aspect, the electromagnetic wave is an infrared ray.

With the sealing head (9) of the ninth aspect, the sealing material (89) is irradiated with the infrared ray through the second substrate (82) such that the sealing material (89) is locally heated.

A sealing head (9) of a tenth aspect is realized in combination with any one of the first to seventh aspects. In the sealing head (9) of the ninth aspect, the intake unit (2) includes a hollow body (21) having an intake path (22) and an opening (214) communicated with the intake path (22). The pressing pin (3) is accommodated in the intake path (22) such that a tip end of the pressing pin (3) protrudes to an outside through the opening (214).

With the sealing head (9) of the tenth aspect, the tip end of the pressing pin (3) protruding from the opening (214) crushes the sealing material (89) while the internal space (85) of the work in progress (8) is kept in an evacuated state by the intake unit (2), thereby sealing the evacuation port (815).

A sealing head (9) of an eleventh aspect is realized in combination with the tenth aspect. In the sealing head (9) of the eleventh aspect, the hollow body (21) further includes a projection (25) which is to be inserted into the evacuation port (815).

With the sealing head (9) of the eleventh aspect, the projection (25) inserted in the evacuation port (815) functions to suppress the sealing material (89) melted by being heated from attaching to the pressing pin (3).

A sealing head (9) of a twelfth aspect is realized in combination with any one of the first to eleventh aspects. The sealing head (9) of the twelfth aspect further includes a detent structure (7) configured to restrict relative rotation of the pressing pin (3) and the frame (1).

With the sealing head (9) of the twelfth aspect, when the sealing material (89) melted by being heated attaches to the pressing pin (3), for example, a worker at least holds and rotates the frame (1) after the sealing step is completed. Since the frame (1) and the pressing pin (3) integrally rotate, part of the sealing material (89) attached to the pressing pin (3) is peeled off from the pressing pin (3).

A sealing head (9) of a thirteenth aspect is realized in combination with the tenth aspect. The sealing head (9) of the thirteenth aspect further includes a detent structure (7) configured to restrict relative rotation of the pressing pin (3) and the frame (1). The detent structure (7) is constituted by an outer peripheral surface (30) of the pressing pin (3) and an inner peripheral surface (220) of the intake path (22).

With the sealing head (9) of the thirteenth aspect, when the sealing material (89) melted by being heated attaches to the pressing pin (3), for example, a worker at least holds and rotates the frame (1) after the sealing step is completed. Since the frame (1) and the pressing pin (3) integrally rotate, part of the sealing material (89) attached to the pressing pin (3) is peeled off from the pressing pin (3).

A method for sealing a work in progress of the glass panel unit of the first aspect includes: detachably attaching the sealing head (9) of any one of the first to thirteenth aspects to a corner (8a) of the work in progress (8); and evacuating the internal space (85) and sealing the evacuation port (815) by using the sealing head (9).

With the method for sealing the work in progress of the glass panel unit of the first aspect, the frame (1) is attached to the corner (8a) when evacuation and sealing are performed, and after the sealing is completed, the frame (1) is detached from the corner (8a), and therefore, no complicated process is required. In addition, no trance of an exhaust pipe remains unlike the prior art technique.

REFERENCE SIGNS LIST

1 FRAME
11 FIRST FRAME
12 SECOND FRAME
17 FRAME SPRING MECHANISM
2 INTAKE UNIT
21 HOLLOW BODY
214 OPENING
22 INTAKE PATH
220 INNER PERIPHERAL SURFACE
25 PROJECTION
27 O-RING
3 PRESSING PIN
30 OUTER PERIPHERAL SURFACE
4 NON-CONTACT HEATER
40 ELECTROMAGNETIC WAVE IRRADIATOR
5 PIN SPRING MECHANISM
6 SHIELDING PLATE
7 DETENT STRUCTURE
8 WORK IN PROGRESS
8a CORNER
81 FIRST SUBSTRATE
810 GLASS PANEL
815 EVACUATION PORT
82 SECOND SUBSTRATE
820 GLASS PANEL
85 INTERNAL SPACE
86 BONDING PART
89 SEALING MATERIAL
9 SEALING HEAD

The invention claimed is:

1. A sealing head for manufacturing a glass panel unit, comprising:
a frame configured to be detachably attached to a work in progress of the glass panel unit;
an intake unit supported by the frame;
a pressing pin supported by the frame; and
a non-contact heater supported by the frame, wherein:
the work in progress includes:
a first substrate including a glass panel and having an evacuation port;
a second substrate including a glass panel;
a bonding part having a frame shape and hermetically bonding together the first substrate and the second substrate located to face each other; and
an internal space formed by being surrounded by the first substrate, the second substrate, and the bonding part, the internal space communicating with the evacuation port, the intake unit is configured to suck in air from the internal space through the evacuation port, the pressing pin is configured to press, toward the second substrate, a sealing material which is heat fusible and which is inserted into the evacuation port to seal the evacuation port, the non-contact heater is configured to locally heat the sealing material in a non-contact manner while the second substrate is disposed between the non-contact heater and the sealing material, the intake unit, the pressing pin, and the non-contact heater are, integrally with the frame, detachably attached to the work in progress, and the frame includes:
- a first frame supporting the intake unit and the pressing pin, and
- a second frame supporting the non-contact heater.

2. The sealing head for manufacturing a glass panel unit of claim 1, wherein in a state where the frame is attached to the work in progress, the pressing pin and the non-contact heater are configured to be located on opposing sides with the second substrate provided between the pressing pin and the non-contact heater.

3. The sealing head for manufacturing a glass panel unit of claim 1, wherein
the frame further includes
a frame spring mechanism configured to urge at least one of the first frame or the second frame such that the second frame relatively moves toward the first frame.

4. The sealing head for manufacturing a glass panel unit of claim 3, further comprising a shielding plate supported by the second frame, wherein
the non-contact heater is an electromagnetic wave irradiator configured to emit an electromagnetic wave, and
the shielding plate is configured to transmit a particular part of an electromagnetic wave radiated while shielding at least part of a remaining part of the electromagnetic wave, the particular part of the electromagnetic wave being directed to the sealing material.

5. The sealing head for manufacturing a glass panel unit of claim 1, further comprising a pin spring mechanism, the spring mechanism being supported by the frame and being configured to press the pressing pin toward the second substrate.

6. The sealing head for manufacturing a glass panel unit of claim 1, further comprising a pin spring mechanism,
the spring mechanism being supported by the first frame and being configured to press the pressing pin toward the second substrate.

7. The sealing head for manufacturing a glass panel unit of claim 1, wherein:
the intake unit includes a hollow body having an intake path and an opening that communicates with the intake path, and
the pressing pin is accommodated in the intake path such that a tip end of the pressing pin protrudes to an outside through the opening.

8. The sealing head for manufacturing a glass panel unit of claim 7, further comprising a detent structure configured to restrict relative rotation of the pressing pin and the frame, wherein
the detent structure is constituted by an outer peripheral surface of the pressing pin and an inner peripheral surface of the intake path.

9. A method for sealing a work in progress of a glass panel unit, the method comprising:
detachably attaching the sealing head of claim 1 to a corner of the work in progress; and
evacuating the internal space and sealing the evacuation port by using the sealing head.

10. A sealing head for manufacturing a glass panel unit, comprising:
a frame configured to be detachably attached to a work in progress of the glass panel unit;
an intake unit supported by the frame;
a pressing pin supported by the frame;
a non-contact heater supported by the frame; and
a shielding plate supported by the frame, wherein:
the work in progress includes:
a first substrate including a glass panel and having an evacuation port;
a second substrate including a glass panel;
a bonding part having a frame shape and hermetically bonding together the first substrate and the second substrate located to face each other; and
an internal space formed by being surrounded by the first substrate, the second substrate, and the bonding part, the internal space communicating with the evacuation port,
the intake unit is configured to suck in air from the internal space through the evacuation port,
the pressing pin is configured to press, toward the second substrate, a sealing material which is heat fusible and which is inserted into the evacuation port to seal the evacuation port,
the non-contact heater is configured to locally heat the sealing material in a non-contact manner while the second substrate is disposed between the non-contact heater and the sealing material,
the intake unit, the pressing pin, and the non-contact heater are, integrally with the frame, detachably attached to the work in progress,
the non-contact heater is an electromagnetic wave irradiator configured to emit an electromagnetic wave, and
the shielding plate is configured to transmit a particular part of the electromagnetic wave while shielding at least part of a remaining part of the electromagnetic wave, the particular part of the electromagnetic wave being directed to the sealing material.

11. The sealing head for manufacturing a glass panel unit of claim 10, wherein
the intake unit includes:
a hollow body having an intake path and an opening that communicates with the intake path, and
an O-ring provided to the hollow body to be located to surround the opening,
the intake unit is configured such that in a state where the O-ring is in contact with the first substrate,
the intake path and the evacuation port hermetically communicate with each other via the O-ring, and
the shielding plate is configured to shield part, of the electromagnetic wave radiated toward the O-ring.

12. The sealing head for manufacturing a glass panel unit of claim 10, wherein
the electromagnetic wave is an infrared ray.

13. A method for sealing a work in progress of a glass panel unit, the method comprising:
detachably attaching the sealing head of claim 10 to a corner of the work in progress; and
evacuating the internal space and sealing the evacuation port by using the sealing head.

14. A sealing head for manufacturing a glass panel unit, comprising:

a frame configured to be detachably attached to a work in progress of the glass panel unit;
an intake unit supported by the frame;
a pressing pin supported by the frame; and
a non-contact heater supported by the frame, wherein:
the work in progress includes:
- a first substrate including a glass panel and having an evacuation port;
- a second substrate including a glass panel;
- a bonding part having a frame shape and hermetically bonding together the first substrate and the second substrate located to face each other; and
- an internal space formed by being surrounded by the first substrate, the second substrate, and the bonding part, the internal space communicating with the evacuation port, the intake unit is configured to suck in air from the internal space through the evacuation port,
the pressing pin is configured to press, toward the second substrate, a sealing material which is heat fusible and which is inserted into the evacuation port to seal the evacuation port,
the non-contact heater is configured to locally heat the sealing material in a non-contact manner while the second substrate is disposed between the non-contact heater and the sealing material,
the intake unit, the pressing pin, and the non-contact heater are, integrally with the frame, detachably attached to the work in progress,
the intake unit includes a hollow body having an intake path, an opening that communicates with the intake path, and a projection which is to be inserted into the evacuation port, and
the pressing pin is accommodated in the intake path such that a tip end of the pressing pin protrudes to an outside through the opening.

15. A method for sealing a work in progress of a glass panel unit, the method comprising:
detachably attaching the sealing head of claim 14 to a corner of the work in progress; and
evacuating the internal space and sealing the evacuation port by using the sealing head.

16. A sealing head for manufacturing a glass panel unit, comprising:
a frame configured to be detachably attached to a work in progress of the glass panel unit;
an intake unit supported by the frame;
a pressing pin supported by the frame;
a non-contact heater supported by the frame; and
a detent structure configured to restrict relative rotation of the pressing pin and the frame, wherein:
the work in progress includes:
- a first substrate including a glass panel and having an evacuation port;
- a second substrate including a glass panel;
- a bonding part having a frame shape and hermetically bonding together the first substrate and the second substrate located to face each other; and
- an internal space formed by being surrounded by the first substrate, the second substrate, and the bonding part, the internal space communicating with the evacuation port, the intake unit is configured to suck in air from the internal space through the evacuation port,
the pressing pin is configured to press, toward the second substrate, a sealing material which is heat fusible and which is inserted into the evacuation port to seal the evacuation port,
the non-contact heater is configured to locally heat the sealing material in a non-contact manner while the second substrate is disposed between the non-contact heater and the sealing material, the intake unit, the pressing pin, and the non-contact heater are, integrally with the frame, detachably attached to the work in progress.

17. A method for sealing a work in progress of a glass panel unit, the method comprising:
detachably attaching the sealing head of claim 16 to a corner of the work in progress; and
evacuating the internal space and sealing the evacuation port by using the sealing head.

* * * * *